United States Patent [19]

Alf et al.

[11] 4,303,872

[45] Dec. 1, 1981

[54] TELESCOPING ANTENNA MOVABLE BY MEANS OF A D.C. MOTOR

[75] Inventors: Reinhard Alf; Kurt Klinkwitz, both of Berlin, Fed. Rep. of Germany

[73] Assignee: Robert Bosch GmbH Geschäftsbereich Elektronik, Stuttgart, Fed. Rep. of Germany

[21] Appl. No.: 57,372

[22] Filed: Jul. 13, 1979

[30] Foreign Application Priority Data

Jul. 21, 1978 [DE] Fed. Rep. of Germany ....... 2832061

[51] Int. Cl.[3] .............................................. H02P 1/00

[52] U.S. Cl. .................................... 318/257; 318/280; 318/282; 318/266; 318/293

[58] Field of Search ................................ 318/280-282, 318/293, 256, 264, 265, 266; 307/9, 10 R, 127, 138; 343/903, 901, 900, 714, 880

[56] References Cited

U.S. PATENT DOCUMENTS

| | | | |
|---|---|---|---|
| 2,933,597 | 4/1960 | Jensen | 343/903 X |
| 3,022,420 | 2/1962 | Brinkerhoff | 343/714 X |
| 3,568,024 | 3/1971 | Robbins | 318/280 X |
| 4,138,630 | 2/1979 | Graham | 318/282 X |

*Primary Examiner*—Ulysses Weldon
*Attorney, Agent, or Firm*—Spencer & Kaye

[57] ABSTRACT

An antenna control system employing a d.c. motor for extending and retracting a telescoping antenna for use on a vehicle. The control system comprises a polarity responsive timer, a polarity reversal switch, and a switching device. In one position of the switching device, a d.c. voltage of a polarity determined by the position of the polarity reversal switch is connected across the motor for an interval of time determined by the timer to extend or retract the antenna. In the other position of the switch, the vehicle operator controls the motor and therefore the antenna position.

6 Claims, 3 Drawing Figures

TELESCOPING ANTENNA MOVABLE BY MEANS OF A D.C. MOTOR

BACKGROUND OF THE INVENTION

The present invention relates to a retractable telescoping vehicle antenna and, in particular, to an antenna which may be retracted or extended by energizing a d.c. motor.

German Patent Application DT-OS No. 26 00 439 discloses a telescoping vehicle antenna which may be retracted or extended by means of a d.c. motor and includes a control device having an electronic timer in the form of a monostable multivibrator circuit. The prior art telescoping antenna operates satisfactorily in conjunction with a receiver, for example, an automobile radio, if the receiving field intensity is below a certain threshold value. However, if this value is exceeded in areas of high receiving field intensity, as may occur for example in the vicinity of a strong transmitter, the receiver will be overdriven or subjected to cross modulation.

SUMMARY OF THE INVENTION

In accordance with the present invention a control device is provided which energizes a drive motor for a certain period of time during which the antenna is retracted or extended. In order to prevent a high frequency receiver connected to the telescoping antenna from being overdriven in areas with high receiving field intensities, an additional switching device is provided for changing the length of the retracted or extended antenna at any time.

While in a first switching state, the switching device permits the control device to control the d.c. motor. In a second switching state, a direct voltage of selectable polarity is applied across the motor terminals in such a manner that the motor retracts or extends the telescoping antenna for the duration of the second switching state. Accordingly, the user can select an antenna length which prevents overdriving of the receiver and provides optimum reception.

In particular, the switching device is provided with means for switching the polarity of the operating d.c. voltage applied to the motor thereby permitting the user to selectively extend or shorten the length of the antenna. If the antenna is retracted too far, as may occur while adjusting the antenna length to the least possible overdrive thereby causing the received signal to be too low, the antenna can be extended by changing the polarity of the operating d.c. voltage applied to the motor.

DESCRIPTION OF THE PREFERRED EMBODIMENTS

Figure 1:
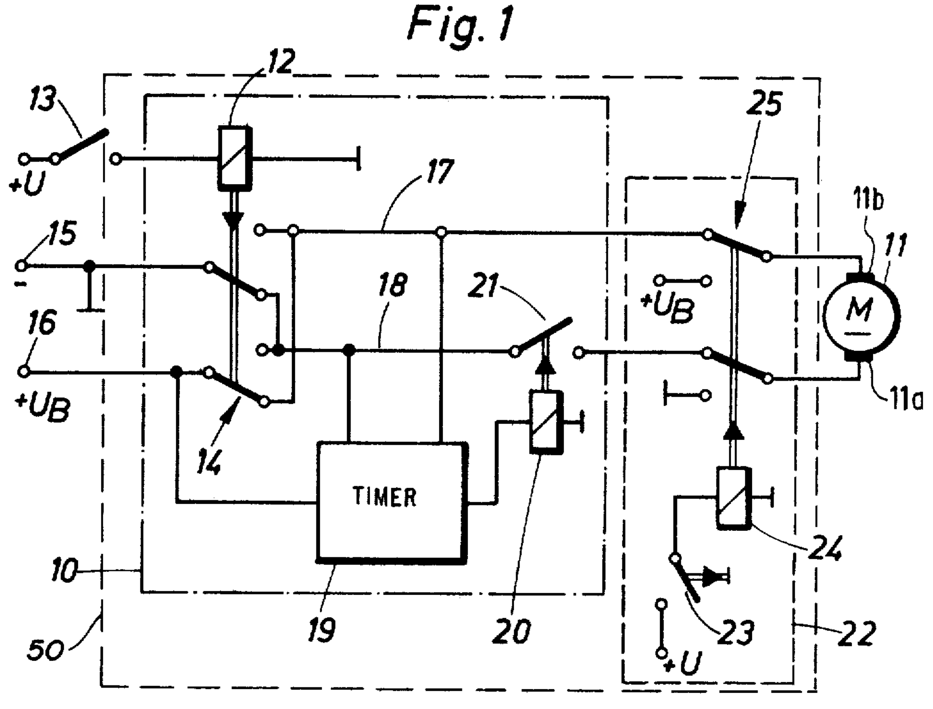
FIG. 1 is a schematic diagram of a control device according to the present invention.

In FIG. 1, the circuit portion outlined by a dot-dash line identifies a control device 10 for a telescoping vehicle antenna which can be retracted or extended by means of a d.c. motor 11. The control device includes a first relay 12 having an excitation winding connected to a circuit which can be opened or closed by a switch 13. The switch 13 is preferably part of the on-off switch of a receiver, such as an automobile radio, to which the telescoping antenna is connected. The relay 12 controls a polarity change switch 14 having movable contacts connected to terminals 15 and 16 of a d.c. voltage source such as a vehicle battery. The movable contacts of the polarity change switch 14 are connectable by leads 17 and 18 to the d.c. motor 11 in such a manner that each closing or opening of switch 13 causes polarity change switch 14 to change the polarity of the voltage across leads 17 and 18. Leads 17 and 18 and terminal 16 are connected to a timer 19 which controls a second relay 20 having a motor switch contact 21.

Figure 3:
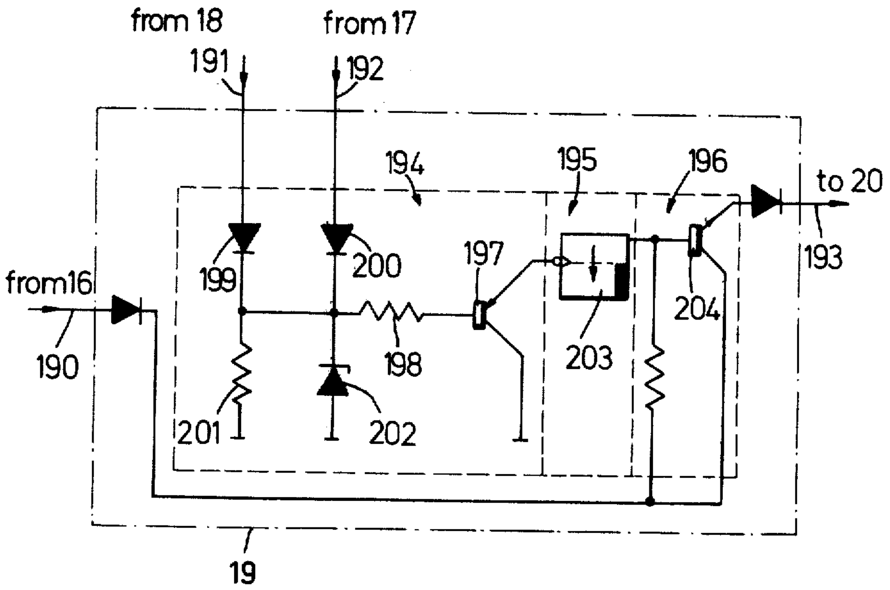
FIG. 3 is a schematic diagram of a timer according to the present invention.

In FIG. 3 timer 19 is provided with a first terminal 190 connected with terminal 16 (see FIG. 1), a second terminal 191 connected with lead 18, a third terminal 192 connected with lead 17, and a fourth terminal 193 connected with relay 20. The timer circuit arrangement comprises three main parts, a pulse generator 194, a timing circuit 195, and an inverter 196. The pulse generator includes a transistor 197, the base of which is connected via a first resistance 198 and two diodes 199, 200 with the leads 17 and 18. The base of transistor 197 is also connected via resistor 198, a second resistance 201 and a zener diode 202 to ground. The timing circuit 195 contains a monostable multivibrator 203 and the inverter 196 a transistor 204.

Leads 17 and 18 are coupled to the d.c. motor 11 by means of a switching device 22 enclosed in FIG. 1 by dashed lines. The switching device 22 includes a relay 24 which is actuated by a key 23 and controls a dual-pole switch 25. In a first position of switch 25, as shown in FIG. 1, the motor is connected to leads 17 and 18. In the second position of switch 25, the motor terminals 11*b* and 11*a* are connected directly across the vehicle battery having a voltage $U_B$.

The circuit operates as follows:

In the normal or quiescent state, switches 13, 14, 21 and 25 are in the position shown in FIG. 1 and no current passes through the motor 11. When switch 13 is closed, for example by switching on the automobile radio, the winding of relay 12 is energized causing the polarity change switch 14 to be switched from its initial position shown in FIG. 1 to its energized position. Operation of switch 14 activates the timer 19 thereby exciting relay 20 and closing motor switch 21. In this way, the d.c. motor 11 receives an operating voltage $U_B$ of such polarity that the motor begins rotating in a direction which extends the antenna. That is, the antenna is extended when terminal 11*a* of motor 11 is positive with respect to terminal 11*b*.

During the time interval when the contacts of polarity change switch 14 move from their initial position shown in FIG. 1 to the other position the leads 17, 18 are momentarily without a potential and transistor 197 is in its conductive state. When the contacts have reached their final position the transistor 197 is non-conductive. The switching of transistor 197 from its conductive to its non-conductive state acts like a trigger pulse for monostable multivibrator 203. The time constant or duration of the monostable multivibrator 203 output pulse is chosen according to the length of time which is necessary so that under normal conditions the telescoping antenna becomes fully extended. At the end of this period, the timer cycles to a state in which relay 20 is deenergized causing motor switch 21 to open. The antenna remains in the extended state until the automobile radio is switched off and switch 13 is opened. Then, the polarity change switch 14 is switched to its initial state, activating timer 19, exciting relay 20 and closing the motor switch 21. Motor 11 now receives the operating voltage $U_B$ with such a polarity that it retracts the telescoping antenna. That is, the antenna is retracted because terminal 11*a* of motor 11 is now negative with respect to terminal 11*b*. The contacts of timer 19 and therefore motor switch 21 remain closed until the antenna telescope has been completely retracted. Then the motor switch 21 is opened, the telescoping antenna remaining in the retracted state. Just as the termination of the multivibrator 203 output pulse causes the antenna to stay extended, the termination of this pulse causes the motor 11 to stop turning when the antenna is completely retracted.

The switching device 22 operates as follows:

If the telescoping antenna is in the extended state, the antenna length can be shortened at any time if, due to too high a receiving field intensity, the automobile radio is overdriven. In this case, the user operates key 23 which applies the voltage $+U$ across the excitation winding of relay 24. When relay 24 is excited, switch 25 is switched to its lower contacts thereby disconnecting the motor from leads 17 and 18 and connecting terminal 11*b* of motor 11 to the positive terminal $U_B$ of the d.c. voltage source and terminal 11*a* to ground. This causes the motor to rotate in a direction which retracts the telescoping antenna. By releasing key 23, the user can interrupt the retraction process and thus select a desired antenna length which will provide interference-free reception.

The above-described embodiment permits only the shortening of the extended telescoping antenna. If it is desired that the user also be able to select an optimum antenna length, the switching device 22 may be modified in such a way that the polarity of the d.c. voltage across the motor 11 may be changed at will by the operator.

Figure 2:
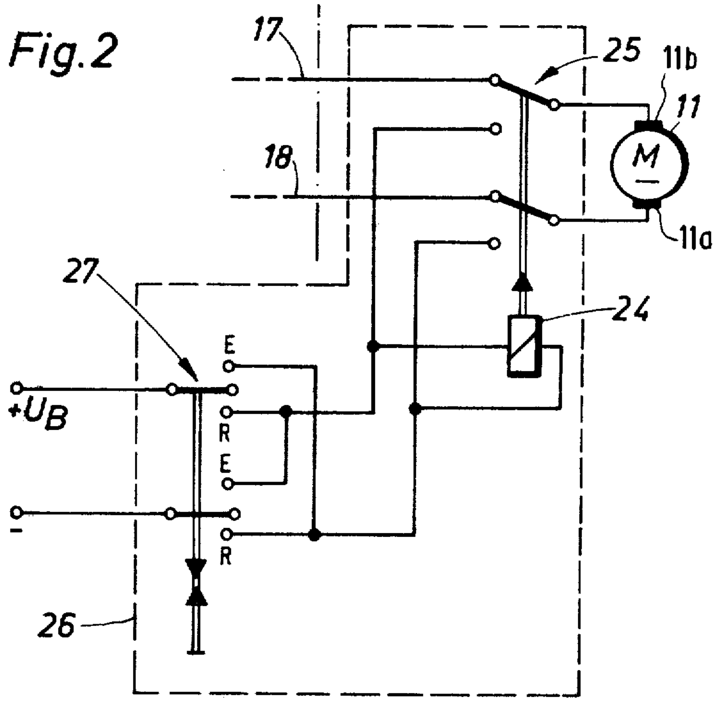
FIG. 2 is a schematic diagram of another embodiment of the invention.

An embodiment of a switching device according to the forementioned modification is shown in FIG. 2 in which a switching device 26 is used instead of the switching device 22 of FIG. 1. Corresponding components of switching devices 22 and 26 are identified by the same reference numerals. Unlike the embodiment of FIG. 1, the switching device of FIG. 2 includes, in addition to switch 25, a double-pole switch 27 which has three switching positions. The movable contacts of switch 27 are connected to the d.c. voltage source $U_B$. When switch 27 is in the center position, the direct voltage $+U_B$ is not connected to the circuit. In the upper and lower switching positions E and R respectively, voltage is applied across the relay 24 with a polarity that depends upon the switch position, either polarity exciting the relay. The energizing of relay 24 closes switch 25 to apply d.c. voltage to motor 11.

More specifically, if switch 27 is moved to its upper position E, relay 24 will be energized causing switch 25 to close and apply a voltage to terminal 11*a* which is positive with respect to that applied to terminal 11*b*. Accordingly, the antenna will be extended. Conversely, if switch 27 is switched to its lower contacts R, relay 24 is again energized closing contacts 25 but terminal 11*b* of motor 11 is made positive with respect to terminal 11*a* causing the antenna to be retracted.

Thus, depending on whether the user moves the switch 27 to the upper E or lower R switching position, the motor rotates in one or the other sense of rotation so that the telescoping antenna is extended or retracted, respectively. Extension or retraction can be interrupted at any time by placing switch 27 in its center position.

Also, as shown in FIG. 1, the control device 10 and switching device 22 may be installed in a common housing 50.

It will be understood that the above description of the present invention is susceptible to various modifications, changes and adaptations, and the same are intended to be comprehended within the meaning and range of equivalents of the appended claims.

What is claimed is:

1. An antenna control system for extending and retracting a telescoping antenna for a vehicle comprising:

a d.c. motor, having first and second terminals, coupled to said antenna, said motor rotating in one direction when a voltage having one polarity is applied across its terminals thereby extending said antenna and in the reverse direction when a voltage of the opposite polarity is applied across its terminals thereby retracting said antenna;

a control device comprising, a polarity responsive timer for closing a contact for a predetermined interval when the polarity of the voltage applied across said timer is reversed, and, a polarity reversal switch for coupling a d.c. voltage source across the terminals of said polarity responsive timer with a selected polarity, the polarity of the voltage across said timer being determined by the position of said polarity reversal switch; and, a switching device having first and second states, said switching device in its first state coupling said polarity reversal switch through said contact to said d.c. motor to cause said motor to rotate in a direction determined by the position of said polarity reversal switch for an interval of time determined by said timer, said switching device in its second state coupling a d.c. voltage source of selectable polarity across said motor for rotation thereof in a direction determined by the polarity of said applied d.c. voltage source.

2. An antenna control system as defined in claim 1 wherein said switching device includes switching means for reversing the polarity of the voltage applied across said motor when said switching device is in its second state.

3. An antenna control system as defined in claim 2 wherein said switching means comprises a double-pole, three-position switch and a relay having contacts for connecting said d.c. motor to said control device, said double-pole three-position switch coupling a voltage across said relay in two of said three positions and across said d.c. motor when said relay is energized, the voltage applied across said motor having one polarity when said switch is in one of said two positions and the opposite polarity when said switch is in the other of said two positions.

4. An antenna control system as defined in claim 3 wherein said relay has first and second contacts in series with the first and second terminals of said d.c. motor.

5. An antenna control system as defined in claim 1 wherein said switching device comprises a relay having first and second contacts in series with the first and second terminals of said d.c. motor, respectively, and, a key switch for selectively connecting a voltage across the excitation winding of said relay.

6. An antenna control system as defined in claim 1 wherein said switching and control devices are in a common housing.

* * * * *